May 30, 1967
I. E. ROSS
3,322,983
DYNAMOELECTRIC MACHINE WITH IMPROVED
WINDING PROTECTION ARRANGEMENT
Filed Jan. 2, 1964
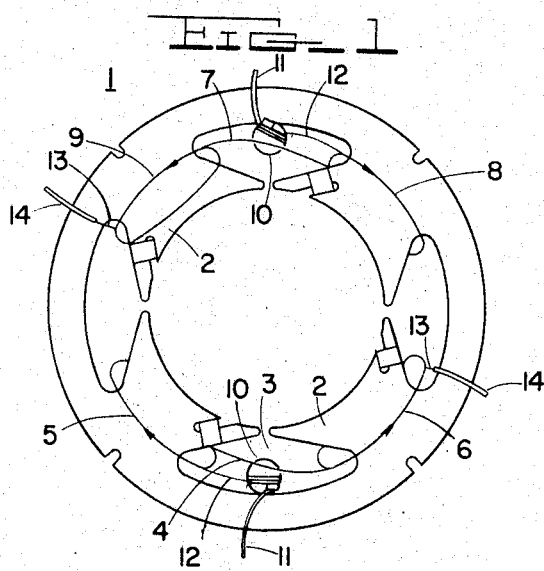
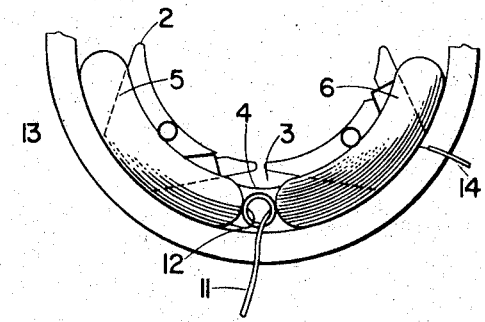
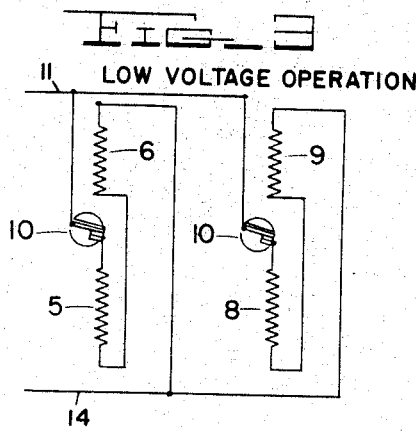
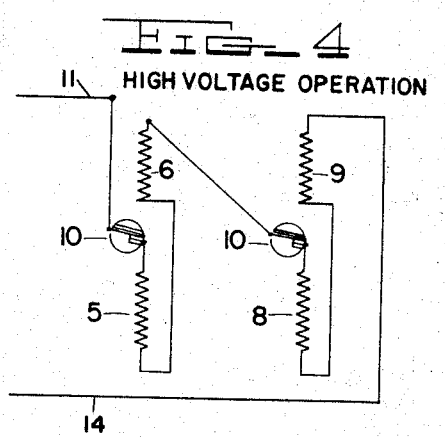
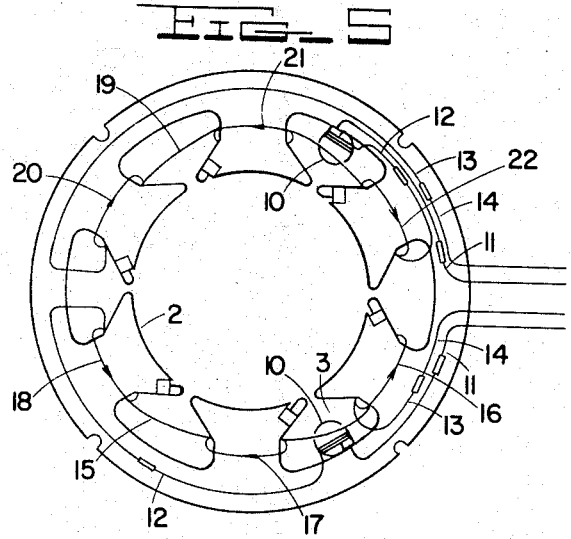
INVENTOR.
IRVINE E. ROSS
BY *Edward J Hanson Jr*
ATTORNEY

United States Patent Office 3,322,983
Patented May 30, 1967

3,322,983
DYNAMOELECTRIC MACHINE WITH IMPROVED WINDING PROTECTION ARRANGEMENT
Irvine E. Ross, Fort Wayne, Ind., assignor to General Electric Company, a corporation of New York
Filed Jan. 2, 1964, Ser. No. 335,042
6 Claims. (Cl. 310—68)

This invention relates to dynamoelectric machines and more particularly to winding protection means for such machines. The invention is intended to provide separate protection of the individual motor windings from damage due to extreme variations in motor conditions and in particular from damage due to excess heat.

In the past various arrangements have been employed to protect the windings of electric motors from excessive heating brought about by the current carried by the windings. One means employed in the past has been to provide a heater element in the winding circuit to actuate a bi-metal circuit breaker. In the usual arrangement the heater and the circuit breaker are spaced from the windings. The circuit breaker normally operates to deenergize all of the motor windings in response to a particular temperature produced by the heater. Another arrangement used in the past has been to emplant heat sensitive devices directly in the turns of the winding. Again, all of the windings were deenergized upon excessive heat being sensed. Where heat sensitive devices have been placed in external contact with the windings themselves, it has been common practice to place them in a manner to sense the heat from as many windings as possible in order to completely deenergize the motor upon the heating of just one of the windings.

It is a principal object of my invention to provide a new and improved protective arrangement for dynamoelectric machines, which will effect positive and independent thermal protection for the separate windings of the motor in response to their individual temperature.

It is another object of my invention to provide such an arrangement wherein the reliable performance of each heat sensing device is increased by being in heat transfer relation with two adjacent coils of a single winding within a slot common to both.

A further object of my invention is the provision of a dual-voltage motor in which the windings are independently deenergized and reenergized in response to their independent heating and cooling under certain conditions.

Still another object of my invention is to provide independent protection for each of the windings of a motor and to provide this protection in a simple and economical way that provides a high degree of dependability.

Briefly stated, in accordance with one form of my invention I provide an improved thermally protected dual voltage single phase induction type electric motor capable of selective operation at a high voltage and a lower voltage. The single phase stator of the motor has one circuit means adapted for energization which includes at least two winding sections each in series circuit with a first heat sensing circuit-interrupting device. This device is in primary heat transfer relation with the two winding sections and is primarily responsive to a predetermined temperature or heated condition of those winding sections. The stator also has another or second circuit means adapted for energization and it also includes at least two winding sections which are each in series circuit with a second heat sensing circuit-interrupting device. Like the first device, this device is in primary heat transfer relation with its associated winding sections of the second circuit means, the device being primarily responsive to a predetermined heated condition of the associated winding sections and generally insensitive to the predetermined heated condition of the two winding sections for the first circuit means.

For high voltage operation, the two circuit means are connected in series relation while for the lower voltage operation, the two circuit means are connected in parallel relation. In the illustrated exemplifications, one terminal of each device is always connected to one end of the associated winding sections, with the two devices being in series relation for high voltage operation and in parallel relation for the lower voltage operation. Under the high voltage operation, the first and second heat sensing circuit interrupting devices are thus each independently operative to an open position to deenergize all of the winding sections in both of the circuit means when the predetermined heated condition is reached in either of the associated winding sections. This, in turn, immediately interrupts operation of the motor.

On the other hand, during the lower voltage operation, each one of the heat sensing devices is operative to deenergize only its associated winding sections when the predetermined heated condition is reached in the vicinity of such device and its associated winding sections, thereby changing the electrical impedance of the stator. However, the stator will continue to operate, at least temporarily, at the lower voltage since the other circuit means is still energized until the predetermined heated condition is reached in the vicinity of the heat sensing device of the other circuit means. Once this occurs, the heat sensing device of this other circuit means will operate and open or deenergize, the last of the circuit means to interrupt operation of the motor entirely.

The foregoing thermal protective arrangement for the single phase motor is particularly advantageous in those dual voltage single phase motor applications where it is desirable, if not essential, to furnish a maximum prudent degree of uninterrupted service from the motor and at the same time to provide adequate protection when potentially dangerous heating conditions occur within the motor. In addition, the number of connections and the quantity of wire required are effectively reduced in spite of the type of dependable protection provided.

The subject matter which I regard as my invention is particularly pointed out and distinctly claimed in the concluding portion of this specification. My invention, however, both as to organization and method of operation, together with further objects and advantages thereof, may be best understood by reference to the following description taken in conjunction with the accompanying drawing in which:

FIG. 1 is a schematic side elevational view of the stator of a dual-voltage motor illustrating the location and connections of the windings and the positioning and wiring of my winding protection means;

FIG. 2 is a detailed view of a fragment of the stator shown in FIG. 1 showing the positioning of the heat sensing device between two coils in one of the windings;

FIG. 3 is a circuit diagram of the stator of FIG. 1 with the windings connected in parallel circuit relation;

FIG. 4 is a circuit diagram of the stator of FIG. 1 with the windings connected in series circuit relation; and FIG. 5 is a schematic side elevational view of a stator illustrating one different arrangement of a dual-voltage motor and the wiring and positioning of the heat sensing device.

Referring now to FIG. 1 of the drawing, for purposes of illustrating my improved thermal protective arrangement in dual-voltage motors, I have shown a stator 1 for use in a dual voltage single-phase shaded pole motor, the stator 1 having a plurality of spaced teeth 2 and with each tooth in the particular stator shown forming a separate salient pole. The teeth 2 are separated by a plurality of winding slots 3 and each tooth includes a conventional shading coil thereon. A winding circuit 4 has two winding sections respectively comprising coils 5 and 6 wound on the stator 1 as schematically shown in FIG. 1. The two coils 5 and 6 are wound upon two adjacent teeth or poles with their turns passing through the slot separating the teeth, the teeth thereby acting as carrying means for the separate coils. In the same manner another winding circuit 7 has two winding sections respectively comprised of coils 8 and 9 is wound upon two other adjacent salient poles. A separate heat sensitive circuit breaker 10 is positioned between the two coils in each winding with one terminal of the circuit breaker being wired directly to the power lead-in 11 and the other terminal of the circuit breaker being wired directly to one end 12 of the winding. The other end 13 of the winding is wired directly to the other power lead-in 14. Thus the two coils of each winding circuit are connected in series with the associated circuit breaker across the respective lead-in connection.

In this arrangement the heat sensing circuit breakers are positioned in heat transfer engagement with the two coils of their respective winding sections. In each case the circuit breaker is inserted down in the slot between the two coils. The individual turns of the coils are in contact with one another, and their individual heating normally tends to bring about a temperature rise at the outer surface of coils representative of the aggregate individual heat of each turn in a given coil. Each heat sensing circuit breaker 10 is in engagement with two separate coils and this positioning normally results in the heat sensing circuit breaker sensing a condition which is representative of the entire winding temperature. Of course, it is usually necessary for both the turns of the winding and the heat sensing device to be electrically insulated and this insulation does somewhat restrict the heat transfer characteristics. Accordingly, the heat sensing circuit breaking device 10 must be chosen to compensate for this reduction in heat transfer. Furthermore, in certain arrangements it may be desired to place the heat sensor in such a manner that it will not be in direct physical engagement with the coils and therefore the term "heat transfer relation" used herein refers to the heat transfer characteristic not to the physical contact of the physical elements of the motor. Also, the heat sensing device may not fill the entire slot between two coils and wedging means may be used to position it in heat transfer relation with the coils, the wedging perhaps being positioned intermediate one or both of the coils and the sensor. Additionally, of course, the entire motor ambient and each element, depending upon how near it is to every other element will in some degree influence every other element's temperature. So, when I refer to the heat sensing device being in heat transfer relation with a coil or winding, I mean that it is primarily responsive to that coil or winding as contrasted to a coil or winding which has little heat flow to it.

The contacts of each heat sensitive circuit breaker 10 are connected in series with the coils of their respective winding. The particular wiring arrangement used, which is outlined above, results in a minimizing of the total number of connections required within the stator and the total amount of wire consumed. It can further be seen that when a dual-voltage motor, for example, is being operated at the lower voltage with its windings in parallel, as shown in FIG. 3, with my improvement one winding circuit can be dropped out or deenergized by its breaker 10 with the other one continuing to be energized. In other words, the windings, because of my improvement, are energized and deenergized in response to their independent heating and cooling.

This arrangement enables the continued operation of the motor for the maximum length of time consistent with preselected operative temperature limits. The motor may be run temporarily on one winding without interruption when a temporary, but nonetheless potentially dangerous, heating condition occurs in the other winding. In my preferred embodiment my heat sensing device 10 has been selected to, as nearly as possible, be insensitive to other normally expected fluctuations in the motor other than heat, for example, fluctuations in current. Of course, if the two windings are in series, as shown in FIG. 4, which would be the normal situation if the motor were operating on its high voltage, then if either circuit breaker opens the entire circuit which would include both windings would be broken and both windings would accordingly be deenergized.

When the windings are in parallel and one of the windings is taken out by its circuit breaker, there is a tendency for the current to increase substantially in the other winding with the result that it may be also taken out or deenergized shortly by its heat sensing circuit breaker. Thus, although the motor will operate temporarily on one winding in the parallel circuit connection as discussed above, this operation may not continue indefinitely unless all of the windings are returned to the line. The temporary one winding operation may be very advantageous in certain applications, where it is desirable, if not essential, to have a maximum prudent degree of uninterrupted service from the motor.

To explain why the current in one winding circuit increases when the other is opened by its circuit breaker it will be understood that with the windings in parallel, and energized, the line current is equally divided between the two parallel circuits. With one winding circuit open, the consequent magnetic saturation reduces the electrical impedance of the structure, increasing the current drawn by the remaining circuit. It will be recalled that the current causes the heating and the greater the current, the greater the heating. It is noted, however, that the current in the winding that remains closed is not doubled, although it does increase.

Of course, my invention is applicable to other stator arrangements besides the four pole stator shown in FIGS. 1 and 2. For example, the number of winding circuits might be varied from two upwardly and the number of coils in a particular protected winding circuit might be increased. My invention is applicable to single or poly voltage motors. Furthermore, the invention can be applied to protect the motor from damage due to extreme variations in motor conditions other than heat. For example, a current sensitive device or a combination heat sensitive and current sensitive device could be substituted for the heat sensitive device. The variations can be as great as the number of possible conditions.

Turning now to FIG. 5, it schematically illustrates the application of my invention to a stator having two winding circuits with each winding circuit having three coils. It will be noted that one of the winding circuits 15 has three coils 16, 17, and 18, wound on individual salient poles 2 with the heat sensing device 10 arranged in a slot 3 between two of the coils similar to the arrangement in FIG. 1. It can also be observed that the wiring is done in the same manner with one power lead-in connected directly to the circuit breaker 10 and the circuit breaker then being wired directly to the winding and the other end of the winding directly to the other power lead-in. The three coils of the winding circuit 15 are themselves connected so that they form a series connection with the circuit breaker 10. Similarly winding circuit 19 is wound in three coils, 20, 21 and 22, with a separate heat sensitive circuit breaker 10 positioned in a slot 3 between two of the coils, and the wiring is again done in the same manner.

Thus, it may be seen that I have provided a new and improved arrangement for independently sensing the heat in separate winding circuits in a single motor and independently removing the winding circuit from energization. It can also be observed that the positioning of my heat sensing circuit breaker and its wiring facilitates accurate operation and minimizes the number of connections required and the quantity of wire required within the motor. Further, it can be seen that my invention can be readily applied in other similar motor protection arrangements.

While in accordance with the patent statutes, I have described what at present is considered to be the preferred embodiments of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. In a thermally protected, single phase alternating-current induction electric motor adapted to operate selectively at first and second voltages, a single phase stator having one circuit means adapted for energization including at least two winding sections each in series circuit with a first heat sensing circuit-interrupting device and in primary heat transfer relation therewith, said first heat sensing device being primarily responsive to a predetermined heat condition of the at least two winding sections; another circuit means adapted for energization including at least two other winding sections each in series circuit with a second heat sensing circuit-interrupting device and in primary heat transfer relation therewith, said second heat transfer circuit-interrupting device being primarily responsive to a predetermined heated condition of the at least two other winding sections and generally insensitive to the predetermined heated condition of the at least two winding sections of said one circuit means; said one circuit means and said other circuit means being connected in series relation for a first voltage operation and in parallel relation for a second voltage operation, said first and second heat sensing circuit-interrupting devices being independently operative to deenergize all of the winding sections in both said one and said other circuit means when the predetermined heat condition is reached in either of the associated at least two winding sections during said first voltage operation to interrupt operation of the motor; and one of the heat sensing circuit-interrupting devices being operative for deenergizing only its associated at least two winding sections when the predetermined heated condition is reached in the vicinity of such winding sections thereby changing the electrical impedance of the stator without interrupting operation of the motor during said second voltage operation, whereby the motor may be operated at least temporarily at the second voltage with the remaining winding sections still being energized until the predetermined heated condition is reached in the vicinity of the other heat sensing circuit-interrupting device to operate that device for deenergizing its associated at least two winding sections to interrupt operation of the motor.

2. The single phase stator of claim 1 in which the at least two winding sections of said one circuit means and the at least two other winding sections of said another circuit means respectively have selected coils in adjacent relation, and the heat sensing circuit-interrupting devices are disposed between the selected coils of the respective winding sections to produce the primary heat transfer relation therewith.

3. The single phase stator of claim 1 in which one terminal of each of the heat sensing circuit-interrupting devices is always connected to one end of the associated at least two winding sections for both voltage operations, the devices being connected in series relation with one another for the first voltage operation and in parallel relation with one another for the second voltage operation.

4. In a thermally protected, single phase alternating-current induction electric motor adapted to operate selectively at a high voltage and a lower voltage, a single phase stator formed with a plurality of spaced apart salient poles carrying a first winding circuit of at least two coils each in series circuit with a first heat sensing circuit-interrupting device and in primary heat transfer relation therewith, said first heat sensing circuit-interrupting device being primarily responsive to a predetermined heat condition of said at least two coils; a second winding circuit of at least two coils carried by said salient poles each in series circuit with a second heat sensing circuit-interrupting device and in primary heat transfer therewith, said second heat sensing circuit-interrupting device being primarily responsive to a predetermined heat condition of the at least two coils of the second winding circuit and generally insensitive to the predetermined heat condition of said at least two coils of the first winding circuit; said first winding circuit connected in series relation with said second winding circuit for high voltage operation and in parallel relation therewith for a second and lower voltage operation; said first and second heat sensing circuit-interrupting devices being independently operative to deenergize both winding circuits concurrently when the predetermined heat condition is reached in either of the associated at least two coils during high voltage operation to interrupt operation of the motor; and one of the heat sensing circuit-interrupting devices being capable of deenergizing only its associated at least two coils when the predetermined heated condition of such at least two coils is reached thereby reducing the electrical impedance of the stator without interrupting motor operation during the lower voltage operation, whereby the motor may be operated at least temporarily at the lower voltage until the predetermined heat condition is reached in the vicinity of the other heat sensing circuit-interrupting device thereby deenergizing its associated at least two coils to interrupt operation of the motor.

5. The single phase stator of claim 4 in which the at least two coils of the first and second winding circuits are carried on separate salient poles and the heat sensing circuit-interrupting devices are disposed in slots between adjacent salient poles respectively carrying the at least two coils in the same winding circuit to produce the primary heat transfer relation between the heat sensing circuit-interrupting devices and their associated at least two coils.

6. The single phase stator of claim 4 in which one terminal of each heat sensing circuit-interrupting device is always connected to one end of its associated coils, said devices being connected in series relation with one another for high voltage operation and in parallel relation with one another for the lower voltage operation.

References Cited

UNITED STATES PATENTS

| 896,217 | 8/1908 | Keinkel | 310—198 |
| 2,304,599 | 12/1942 | Rigby | 310—68.3 |
| 2,629,848 | 2/1953 | Charlton | 318—472 |
| 2,707,763 | 5/1955 | Kurtz | 318—473 |
| 2,808,554 | 10/1957 | Capps | 310—198 |
| 2,909,719 | 10/1959 | Dubberley | 318—473 |
| 2,967,269 | 1/1961 | Vaughan | 318—473 |
| 3,135,883 | 6/1964 | Phillips | 310—68 |
| 3,211,934 | 10/1965 | Pleiss | 310—68 |
| 3,219,856 | 11/1965 | Dunwiddie | 310—68 |
| 3,246,183 | 4/1966 | Slonneger | 310—68 |

FOREIGN PATENTS 766,901  7/1934  France.

MAX L. LEVY, *Primary Examiner.*

J. D. MILLER, *Assistant Examiner.*